US010102378B2

(12) United States Patent
Oh et al.

(10) Patent No.: US 10,102,378 B2
(45) Date of Patent: Oct. 16, 2018

(54) BOOT IMAGES FOR UNITS UNDER TEST

(71) Applicant: HEWLETT PACKARD ENTERPRISE DEVELOPMENT LP, Houston, TX (US)

(72) Inventors: Sung Oh, Roseville, CA (US); Barry L. Goodwin, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 203 days.

(21) Appl. No.: 15/279,676

(22) Filed: Sep. 29, 2016

(65) Prior Publication Data
US 2018/0089438 A1    Mar. 29, 2018

(51) Int. Cl.
*G06F 21/57* (2013.01)
*G06F 21/53* (2013.01)

(52) U.S. Cl.
CPC ............ *G06F 21/577* (2013.01); *G06F 21/53* (2013.01); *G06F 21/575* (2013.01); *G06F 2221/034* (2013.01)

(58) Field of Classification Search
CPC ........ G06F 21/53; G06F 21/57; G06F 21/575; G06F 21/577; G06F 2221/034; G06F 9/4416
See application file for complete search history.

(56) References Cited

U.S. PATENT DOCUMENTS

| 7,207,039 | B2 * | 4/2007 | Komarla | G06F 9/4416 |
| | | | | 713/2 |
| 7,305,561 | B2 | 12/2007 | Hunt et al. | |
| 7,428,663 | B2 | 9/2008 | Morton et al. | |
| 8,543,799 | B2 | 9/2013 | McCarron et al. | |
| 9,152,794 | B1 * | 10/2015 | Sanders | G06F 21/575 |
| 2003/0084342 | A1 * | 5/2003 | Girard | G06F 21/305 |
| | | | | 726/4 |
| 2004/0153637 | A1 * | 8/2004 | Harper | G06F 9/4416 |
| | | | | 713/1 |
| 2005/0005096 | A1 * | 1/2005 | Miller | G06F 9/4416 |
| | | | | 713/155 |
| 2005/0055691 | A1 * | 3/2005 | O'Neal | G06F 9/4416 |
| | | | | 717/174 |
| 2005/0071677 | A1 * | 3/2005 | Khanna | G06F 21/575 |
| | | | | 726/4 |
| 2006/0230165 | A1 * | 10/2006 | Zimmer | G06F 8/65 |
| | | | | 709/230 |
| 2010/0082960 | A1 | 4/2010 | Grobman et al. | |
| 2012/0102309 | A1 * | 4/2012 | Lin | G06F 9/4416 |
| | | | | 713/2 |

* cited by examiner

*Primary Examiner* — Minh Dinh
(74) *Attorney, Agent, or Firm* — Hewlett Packard Enterprise Patent Department

(57) ABSTRACT

Example implementations relate to boot images for units under test. In an example implementation, responsive to a unit under test (UUT) being booted to a default boot image, a system receives a key pair from the UUT, creates a unique boot image that includes a private key of the key pair, associates the unique boot image with an identification of the UUT, and registers a MAC address of the UUT. The system may provide the unique boot image to the UUT upon detection of the registered MAC address, authenticate with the UUT using the key pair, and verify that the UUT booted to the unique boot image bears the identification associated with unique boot image. Upon a successful verification, the system may execute a test suite with the UUT.

10 Claims, 7 Drawing Sheets

BOOT IMAGES FOR UNITS UNDER TEST

BACKGROUND

Data center equipment may be manufactured in a factory environment that includes persistent servers to test and configure the data center equipment at various points of the manufacturing process. The servers may communicate with the data center equipment being manufactured via a wired or wireless network of the factory environment.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

Figure 1:
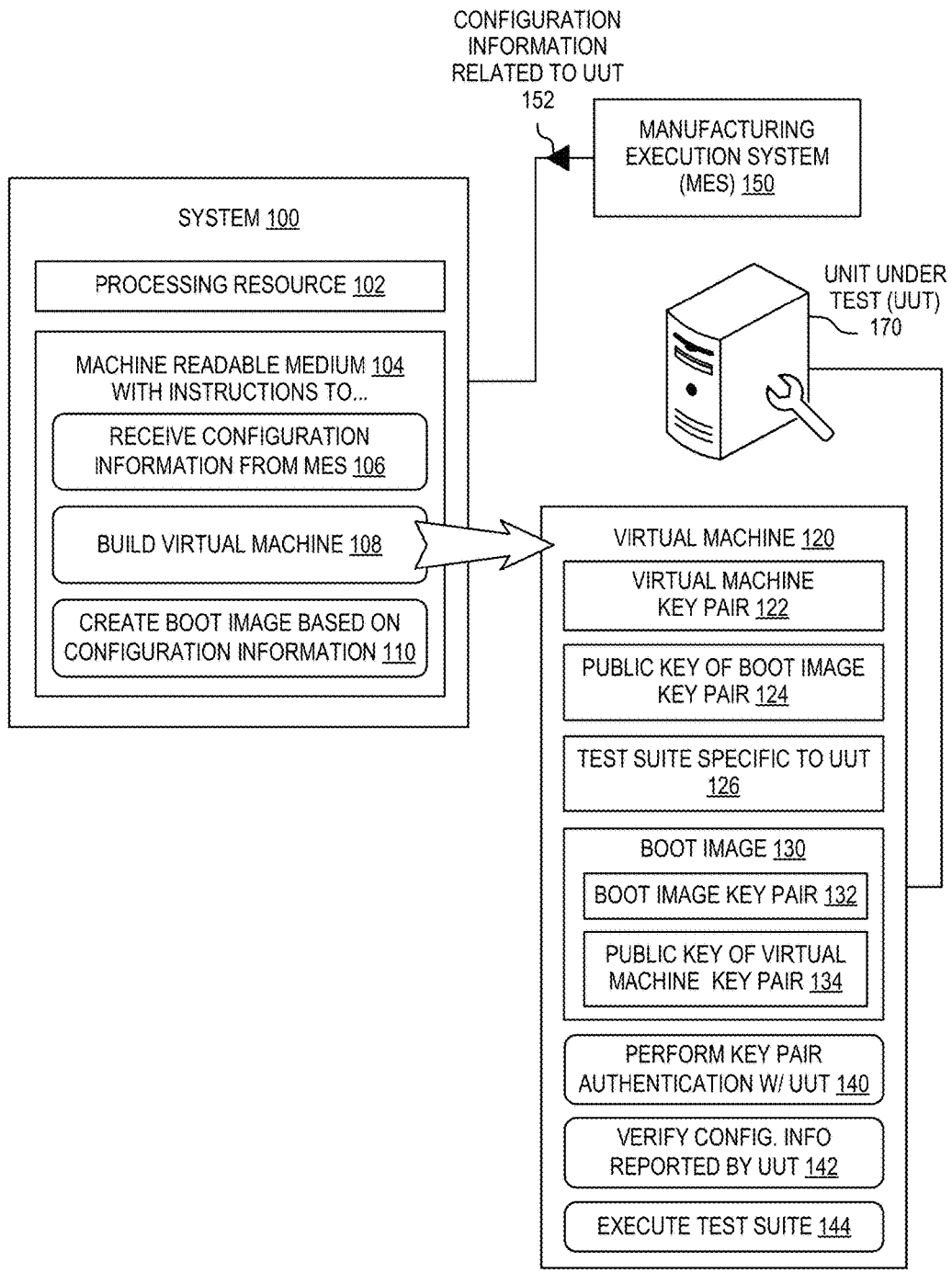
FIG. 1 is a block diagram depicting an example system that builds a virtual machine for a unit under test.

Factories that manufacture data center equipment, such as servers, storage systems, and network devices, may utilize fixed and persistent servers within the factory infrastructure to configure and test customer orders for data center equipment. Customer equipment in the manufacturing environment may also be referred to as a "unit under test" or UUT.

The factory servers themselves may be targeted by malicious cyber-attacks. Cyber-attacks may threaten intellectual property of the manufacturing company (intellectual property in, e.g., test processes, quality information, configurations, various manufacturing and testing code, etc.), may expose the customer equipment to malware before shipping, or may present other negative outcomes. For example, a privileged group account and password may be utilized at the UUT to initiate configuration and testing with the factory servers, but such account and password information may become commonly known (non-secret) in the factory and thus present as pose a cyber-attack vulnerability.

In some instances, factory infrastructure may employ network traffic monitoring to detect malware. However, by the time malware or a cyber-attack is detected, containment may no longer be possible, and the factory infrastructure and customer equipment may already be in jeopardy or may be compromised. Accordingly, it may be useful to provide protection against cyber-attacks and infiltration in the first place.

Some examples disclosed herein may relate to, among other things, a test system that builds a custom virtual machine and a custom boot image for a particular unit under test, based on information received about the UUT from a manufacturing execution system (MES). The virtual machine and the boot image are each customized with a set of respective cryptographic keys, and the virtual machine includes a test suite for testing the UUT specifically. The virtual machine may be locked to, and responsive only to, the UUT. In some implementations, the custom boot image includes drivers, firmware, or the like, specific to the configuration of the UUT as indicated at the MES. The UUT may network boot the custom boot image hosted by the virtual machine and engage in a two-way key pair authentication with the virtual machine. When the UUT has booted to the custom boot image, the virtual machine may verify that the booted UUT is actually the UUT for which the virtual machine was customized by checking configuration information reported by the booted UUT against configuration information at the MES. Upon a successful verification, the virtual machine may execute the test suite with the UUT.

In view of the foregoing example, it can be appreciated that testing a unit under test in a manufacturing environment can be performed in a secure manner. In particular, by creating a customized, disposable, and sandboxed virtual machine to communicate with a UUT rather than direct communication between the UUT and the persistent test system, factory infrastructure may be isolated and protected from malicious cyber-attacks.

Other examples disclosed herein may relate to, among other things, a test system that creates a unique network-bootable boot image for a unit under test. For example, the test system may provide a network-bootable default boot image, and a UUT may initially boot to that default boot image. With the UUT booted to the default boot image, the test system may receive a key pair generated by the UUT and create a new, unique boot image with the private key of that key pair installed in the unique boot image. The test system may register a MAC address of the UUT for subsequent network-booting of the unique boot image and may associate the unique boot image with an identification of the UUT, such as a work order number or a physical test bay location. In response to the UUT seeking to network boot, the test system detects the UUT MAC address and provides the unique boot image, and engages in key pair authentication with the UUT during the boot process (using the key pair and the private key). The test system may then verify that the UUT booted to the unique boot image bears the identification previously associated with the unique boot image, and the test system may execute a test suite upon a successful verification.

By virtue of the foregoing example, privileged access on a particular UUT for test execution is provided through the use of a uniquely credentialed, disposable network-bootable boot image. Use of the boot image may be restricted to the particular UUT owing to key pairing and identification verification. Accordingly, access to factory infrastructure and UUTs may be controlled, thus providing protection from malicious cyber-attacks.

Referring now to the figures, FIG. 1 is a block diagram depicting an example system 100 that builds a virtual machine for a unit under test. The system 100 may be, for example, part of factory infrastructure involved in manufacturing customer orders for data center equipment. For example, as depicted in FIG. 1, a UUT 170 may represent a customer equipment order presently being manufactured (e.g., a server, a storage system, a network device, or other electronic device). The system 100 may be part of a server, such as a test system (also known as a test executive system).

The system 100 includes a processing resource 102 and a non-transitory machine readable medium 104 storing (or encoded with) instructions 106, 108, 110 that, when executed by the processing resource 102, cause the processing resource 102 (and more generally, the system 100) to perform the functionality described below. The processing resource 102 may be a microcontroller, a microprocessor, central processing unit (CPU) core, an application-specific integrated circuit (ASIC), a field programmable gate array (FPGA), and/or the like, suitable for retrieving and executing instructions from the medium 104. The non-transitory machine readable medium 104 may be random access memory (RAM), read-only memory (ROM), electrically erasable programmable read-only memory (EEPROM), flash memory, a hard disk drive, etc. The term "non-transitory" does not encompass transitory propagating signals. In some implementations, the storage and/or execution of the instructions 106, 108, 110 may be distributed across multiple systems.

The system 100 may also be in communication with a wired and/or wireless network, by which the system 100 may communicate with other systems of the factory infrastructure, such as the UUT 170 or a manufacturing execution system (MES) 150. The MES 150 may be a computing system (i.e., server, workstation, desktop computer, etc.) that possesses the configuration of a customer equipment order (e.g., a bill of materials) and that documents the assembly of raw materials and components into a finished good per the customer equipment order.

By executing instructions 106, the processing resource 102 may receive, from the MES 150, configuration information 152 related to a UUT 170. In some instances, the MES 150 may push the information to the system 100, while in other instances, the system 100 may retrieve the information from the MES 150. Configuration information 152 related to the UUT 170 may include, for example, part number(s), serial number(s), a MAC (media access control) address of the UUT 170, a Universally Unique Identifier (UUID), or the like.

By executing instructions 108, the processing resource 102 may build a virtual machine 120 for the UUT 170. The virtual machine 120 may be an emulation of a test system (e.g., such as the system 100). In other words, the virtual machine 120 may provide at least some of the same or similar functionality as a test system, such as a user interface, test automation software, testing software, an interface to the MES 150, services or servers (e.g., Dynamic Host Configuration Protocol or "DHCP" service, a Trivial File Transfer Protocol or "TFTP" service, etc.), and other functions. In particular, the virtual machine 120 may be built to provide network booting functionality, such as network booting according to the Preboot eXecution Environment (PXE) specification which utilizes DHCP and TFTP services.

The virtual machine 120 may be instantiated on the system 100 or another computing system not shown in FIG. 1 that may be in communication with the wired and/or wireless network of the factory infrastructure. The virtual machine 120 may be sandboxed from the rest of the system on which it is instantiated.

The virtual machine 120 may be locked to the UUT 170 using, for example, configuration information 152 received from the MES 150. For example, in some implementations, the virtual machine is locked to the UUT 170 by registration of a MAC address of the UUT 170 to a DHCP service of the virtual machine 120. In some implementations, locking of the virtual machine 120 to the UUT 170 may be implemented as part of instructions 108. Accordingly, the virtual machine 120 may be controlled to communicate solely with devices whose MAC addresses have been so registered.

As will be described, the virtual machine 120 may be built by execution of instructions 108 to include a virtual machine key pair 122 (e.g., an asymmetric cryptographic key pair that includes a private key and a public key) and a test suite 126 specific to the UUT 170. Additionally, building the virtual machine 120 may include configuring or loading the virtual machine 120 with machine executable instructions, scripts, and the like, to perform the functionality 140, 142, 144 described further herein below.

The virtual machine key pair 122 may be generated for inclusion into the virtual machine 120 based on the UUID of the virtual machine 120, and more particularly, by utilizing a UUID of the virtual machine 120 as a passphrase to a key generator (e.g., an RSA algorithm-based generator). In other examples, different identifying information or configuration information related to the virtual machine 120 may be utilized as a passphrase. In some implementations, the key generator may be executed on the system 100 (e.g., as part of instructions 108) to generate the virtual machine key pair 122, while in other implementations, the key generator may be executed on the virtual machine 120 (under control of instructions 108) to generate the virtual machine key pair 122.

As described above, the virtual machine 120 also includes a test suite 126 specific to the UUT 170. For example, the instructions 108 may include further instructions executable by the processing resource 102 to determine from the configuration information 152 received from the MES 150 a firmware self-test, offline diagnostic, or online diagnostic specific to (i.e., related to) the UUT 170 for incorporation into the test suite 126. The processing resource 102 may also determine a selection of software, documentation, automation tools, or the like to incorporate into the test suite 126. For example, if the MES 150 indicates that the UUT 170 is to have a "brand X, model Y" network interface card, the system 100 may include a driver and diagnostic tool for the "brand X, model Y" network interface card.

By executing instructions 110, the processing resource 102 may create a network-bootable boot image 130 with a boot image key pair 132 generated based on the configuration information 152 received from the MES 150 via execution of the instructions 106. In some implementations, the boot image 130 may include firmware, drivers, etc. that would allow the UUT 170 to boot to an operational state. For example, the boot image 130 may include firmware, drivers, or the like to support a network card, processor architecture, memory configuration, etc. of a server UUT. In some implementations, the boot image 130 also may include automation, scripts, and the like, to assist with interfacing between the virtual machine 120 and the UUT 170 when booted to the boot image 130. Instructions 110 may store the boot image 130 on the virtual machine 120, as depicted in FIG. 1.

The boot image key pair 132 (e.g., an asymmetric cryptographic key pair that includes a private key and a public key) may be generated for inclusion into the boot image 130 based on a UUID of the UUT 170 that is included in the received configuration information 152. For example, the system 100 may utilize the UUID of the UUT 170 as a passphrase to a key generator to generate the boot image key pair 132, and then the system 100 may embed the boot image key pair 132 into the boot image 130. In other examples, different identifying information or configuration information 152 related to the UUT 170 may be utilized as a passphrase, such as a customer order number.

The system 100 may exchange public keys between the boot image 130 and the virtual machine 120. For example, a public key 134 of the virtual machine key pair 122 may be copied to the boot image 130, and a public key 124 of the boot image key pair 132 may be copied to the virtual machine 120. In some implementations, copying of the public keys 134, 124 in this manner may be implemented as part of instructions 108, 110, or other instructions on the medium 104 that are not shown.

Once the virtual machine 120 has been built via the instructions 108 and the boot image 130 has been created via the instructions 110, the system 100 starts up the virtual machine 120. The UUT 170 attempts to network boot over the factory infrastructure, and the virtual machine 120 responds to the UUT 170 (owing to being locked to the UUT 170) by permitting the UUT 170 to network boot to the boot image 130. More particularly, in some cases, the UUT 170 and the virtual machine 120 may execute a PXE boot handshake—for example, the UUT 170 attempts to network boot by broadcasting DHCP discovery packets containing a PXE option, the DHCP service of the virtual machine 120 responds with an IP address of the TFTP service of the virtual machine 120 and the filename of the boot image 130, and the UUT 170 downloads the image from the TFTP service and boots accordingly.

As the UUT 170 boots to the boot image 130, the virtual machine 120 performs (140) a two-way key pair authentication (e.g., SSH key pair authentication) with the UUT 170 using the virtual machine key pair 122 and the boot image key pair 132. For example, the UUT 170 may encrypt a different challenge message using a private key of the boot image key pair 132 (available via the boot image 130) and transmit the encrypted challenge message to the virtual machine 120. The virtual machine 120 may then decrypt the received encrypted challenge message using the public key 124 and send the decrypted message back to the UUT 170 for verification against the original challenge message.

Similarly, the virtual machine 120 may encrypt a challenge message using a private key of its virtual machine key pair 122 and transmit the encrypted challenge message to the UUT 170. In turn, the UUT 170 may decrypt the received challenge message using the public key 134 (available to the UUT 170 by virtue of booting to the boot image 130) and send the decrypted challenge message back to the virtual machine 120 for verification against the original challenge message. By virtue of the foregoing, two-way trusted communication may be established between the virtual machine 120 and the UUT 170.

The virtual machine 120 also verifies (142) configuration information reported by the UUT 170. For example, with the UUT 170 booted to the boot image 130, the UUT 170 may collect various configuration information about itself and automatically send configuration information to the virtual machine 120, or the virtual machine 120 may request or collect the configuration information. In some implementations, configuration information collection and reporting is controlled at the UUT 170 via automation or scripts included in the boot image 130 by instructions 108. The virtual machine 120 may then compare the reported configuration information against configuration information associated with the UUT 170 at the MES 150. If the reported configuration information matches the configuration information at the MES 150, the verification is deemed successful. On the other hand, the verification is deemed to have failed if the reported configuration information does not match the configuration information at the MES 150.

For example, in some implementations, the configuration information to be verified may be a Universally Unique Identifier (UUID) (that is, the virtual machine 120 is to verify configuration information reported by the UUT by comparison of a Universally Unique Identifier (UUID) reported by the UUT to a UUID associated with the UUT 170 at the MES 150). In some implementations, the configuration information to be verified may be related to a bill of materials information, such as part numbers, serial numbers, specifications, etc. In some implementations, the verification may be multi-staged for efficiency—for example, if the UUID reported by the UUT matches the UUID associated with the UUT 170 at the MES 150 (a first stage verification), the virtual machine 120 further compares configuration information reported by the UUT to a bill of materials associated with the UUT at the MES 150 (in a second stage verification). With more complex UUTs, the second stage verification may take more time to perform than the first stage verification, owing to the time to collect information about the UUT, and so a first stage verification may be a useful threshold verification.

The virtual machine 120 can then execute (144) the test suite 126 with the UUT 170 upon a successful configuration information verification. For example, execution of the test suite 126 may include running diagnostic tools on the UUT 170 (e.g., firmware self-test, online diagnostic, offline diagnostic), and in some examples, may include upgrading or installing drivers and flashing firmware to the UUT 170 or other test-related actions.

By virtue of the two-way trusted communication between the virtual machine 120 and the UUT 170, test data generated by execution of the test suite 126 may either be pushed by the UUT 170 to the virtual machine 120 or may be retrieved by the virtual machine 120 from the UUT 170. Test data may include, for example, results from execution of diagnostic tools (pass/fail, qualitative or quantitative results, error codes, etc.).

In some implementations, the virtual machine 120 may block communication from any device that is not the UUT 170, namely, any device having a MAC address not registered with the DHCP service and reporting configuration information that does not match configuration information associated with the UUT 170 at the MES150. If a device that is not the UUT 170 boots to the boot image 130, the virtual machine 120 may terminate communications with that device if reported configuration information is not verified. Moreover, in some implementations, the virtual machine 120 may issue an alert (e.g., to the system 100 or over the factory infrastructure) indicating the presence of the unverified device, and such alert may trigger further investigation.

Owing to the test suite 126 being executed by a virtual machine 120 specifically created for the UUT 170 and sandboxed from the rest of the hardware on which the virtual machine 120 is instantiated, exposure of persistent factory infrastructure (i.e., system 100) to cyber-attacks may be reduced. Additionally, exposure of UUTs to cyber-attacks also may be reduced. Moreover, by virtue of the two-way key pair authentication and configuration information verification, intellectual property such as firmware, drivers, diagnostic tools, automation, scripts, test data, etc. may be protected.

In an environment manufacturing and testing multiple UUTs, the factory infrastructure may include multiple systems like system 100. Moreover, each system may build multiple virtual machines for respective UUTs.

Figure 2:
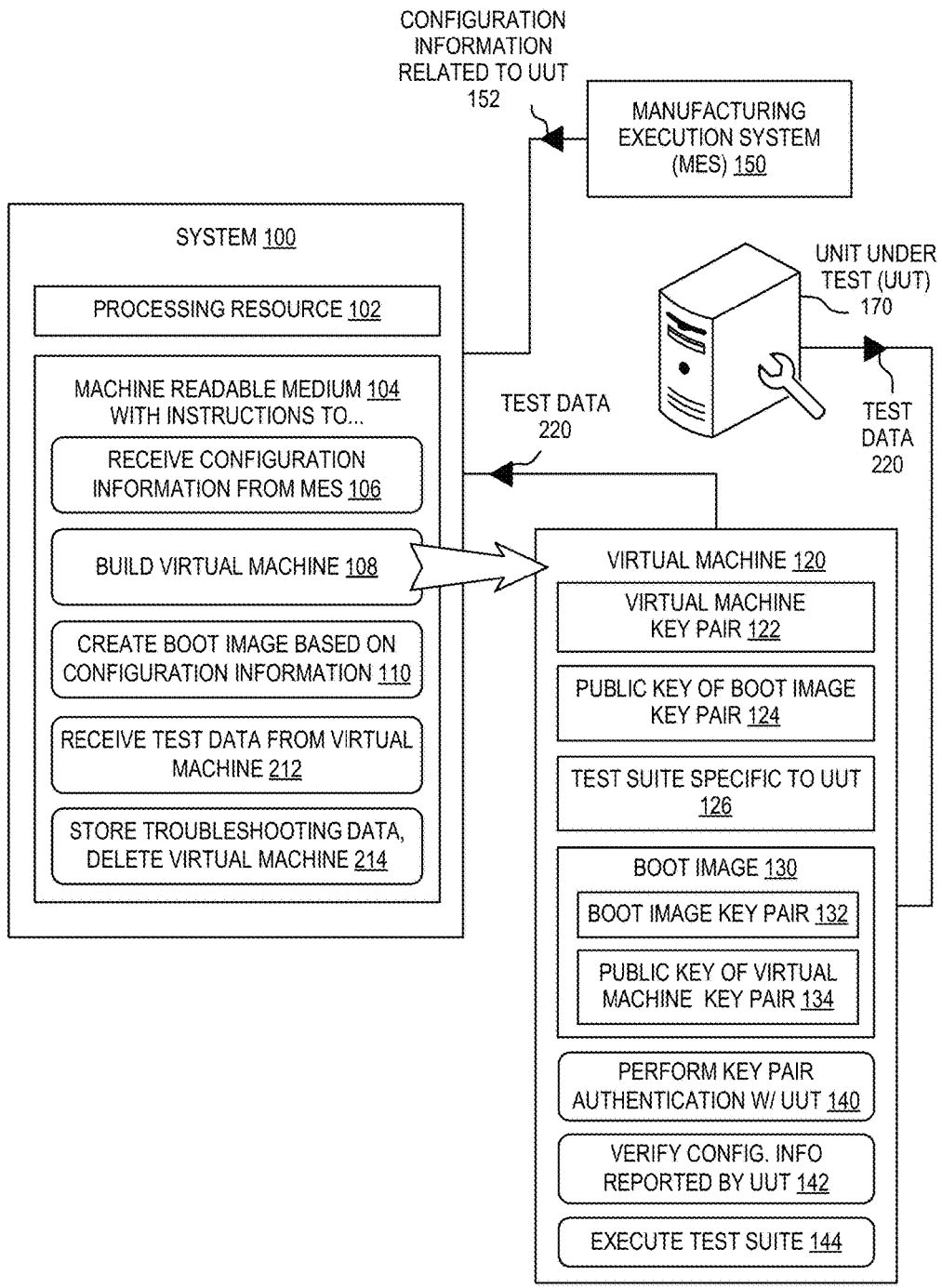
FIG. 2 is a block diagram depicting another example system that builds a virtual machine for a unit under test.

FIG. 2 is a block diagram depicting another example implementation of the system 100. The system 100 depicted in FIG. 2 may include many features of the system 100 depicted in FIG. 1, including a processing resource 102 and non-transitory machine readable medium 104 with instructions 106 to receive configuration information from an MES 150, instructions 108 to build the virtual machine 120, and instructions 110 to create the boot image 130. The virtual machine 120 may execute (144) the test suite 126 with UUT 170 upon a successful configuration information verification, as described above, and the virtual machine 120 may receive test data 220 from the UUT 170 in response to execution of the test suite 126.

The system 100 of FIG. 2 may include instructions 212 and 214 stored on the machine readable medium 104. When executed, instructions 212 may cause the processing resource 102 to receive the test data 220 from the virtual machine 120. In various implementations, the virtual machine 120 may upload the test data 220 to a test system, such as the system 100, or the system 100 may request or retrieve the test data 220 from the virtual machine 120.

When executed, instructions 214 may cause the processing resource 102 to store manufacturing quality data related to the virtual machine 120 and then delete the virtual machine 120. In some examples, manufacturing quality data may include configuration information for replicating or rebuilding the virtual machine 120 or the boot image 130 at a later point in time (e.g., for troubleshooting purposes). For example, the manufacturing quality data may include an inventory of the services, software, or other files employed in testing the UUT 170. Other example manufacturing quality data may relate to failures, errors, faults, etc. of the UUT 170 arising during execution of the test suite 126 or otherwise. In some implementations, instructions 214 are triggered by completion of execution of the test suite 126 by the virtual machine 120, thus ensuring that all testing is complete prior to deletion of the virtual machine 120. By virtue of deleting the virtual machine 120 upon completion of testing the UUT 170, factory infrastructure utilized in testing the UUT 170 is no longer accessible and thus no longer available to cyber-attacks or hacking.

Figure 3:
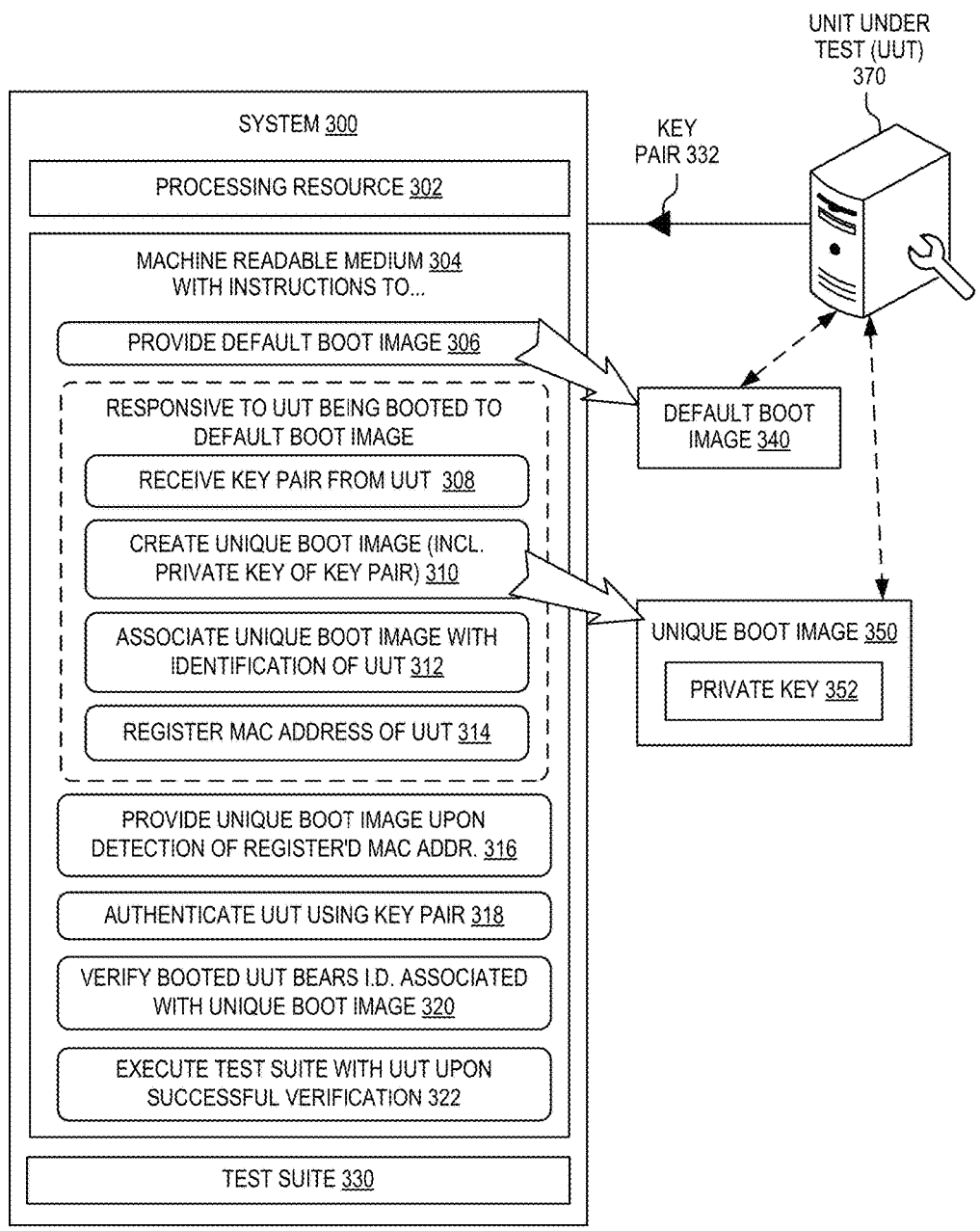
FIG. 3 is a block diagram depicting an example system that creates a boot image for a unit under test.

FIG. 3 is a block diagram depicting an example system 300 that creates a boot image for a unit under test. As with the system 100, the system 300 may be, for example, part of factory infrastructure involved in manufacturing customer orders for data center equipment. For example, as depicted in FIG. 3, a UUT 370 may represent a customer equipment order, similar to the UUT 170. The system 300 may communicate with the UUT 370 over any wired and/or wireless network.

The system 300 includes a processing resource 302 and a non-transitory machine readable medium 304 storing (or encoded with) instructions 306, 308, 310, 312, 314, 316, 318, 320, 322 that, when executed by the processing resource 302, cause the processing resource 302 (and more generally, the system 300) to perform the functionality described below. The processing resource 302 and the medium 304 may be analogous in many respects to the processing resource 102 and the medium 104, respectively. In some implementations, the storage and/or execution of the instructions 306-322 may be distributed across multiple systems.

By executing instructions 306, the processing resource 302 may provide a network-bootable default boot image 340. For example, the UUT 370 may network boot with PXE to the default boot image 340 over a network of the factory infrastructure. The boot image 340 may include, for example, firmware and drivers (e.g., for a network card, processor architecture, memory configuration, etc.), components, and services to support devices, the UUT 370. In some cases, the default boot image 340 may support a wide range of devices manufactured in the manufacturing environment.

In response to the UUT 370 being booted to the default image, the processing resource executes instructions 308, 310, 312, 314. By executing instructions 308, the processing resource 302 may receive a key pair 332 from the UUT 370. For example, the UUT 370 may utilize a key generator (e.g., an RSA algorithm-based key generator) provided in the default boot image 340 to generate the key pair 332, and may transmit such key pair 332 back to the system 300. More particularly, the UUT 370 may generate the key pair 332 using a passphrase based on a UUID burned in to the UUT 370.

The processing resource 302 executing instructions 310 creates a network-bootable unique boot image 350 that includes a private key 352 of the received key pair 332. In some implementations, the unique boot image 350 may be a default boot image with the private key 352 installed therein. Some implementations of instructions 310 may install automation or scripts to assist with interfacing between the system 300 and the UUT 370 when booted to the unique boot image 350.

The processing resource 302 executing instructions 312 associates the unique boot image 350 with an identification of the UUT 370. For example, the identification of the UUT 370 may include a work order number of the UUT 370 or a test bay location of the UUT 370 (e.g., test rack number and/or test bay number). The test system 300 may retrieve such identification of the UUT 370 from a manufacturing execution system, by tracing a physical location of a network port to which the UUT 370 is connected, by reading an identification USB key plugged into the UUT 370, by prompting an operator, or from other sources. To associate the unique boot image 350 with the identification, instructions 312 may cause the processing resource 302 to name the unique boot image 350 according to the identification (e.g., a filename: {PXEIMAGE}-{Work Object}-{Test Rack}-{Test Bay}), may link the boot image 350 with the identification in a table, or the like.

The processing resource 302 executing instructions 314 registers a media access control (MAC) address of the UUT 370, For example, the system 300 may capture the MAC address of the UUT 370 for registration when the UUT 370 communicated with a DHCP service of the system 300 to boot to the default boot image 306. In some implementations, the MAC address is registered to a DHCP table for MAC filtering to a PXE network boot with the unique boot image 350.

Upon detection of the registered MAC address (i.e., the MAC address registered by execution of instructions 314), the processing resource 302 executes instructions 316 to provide the unique boot image 350 to the UUT 370. For example, the UUT 370 may power cycle or otherwise terminate running the default boot image 340, and upon starting up again, the UUT 370 may broadcast DHCP discovery packets with a PXE network boot option. In response, the system 300 may detect that the MAC address is registered and then respond to the UUT 370 with a PXE handshake that results in providing or offering the unique boot image 350 (e.g., via provision of a TFTP IP address).

As the UUT 370 boots the unique boot image 350, the processing resource 302 may execute instructions 318 to authenticate with the UUT 370 using the key pair 332. For example, the UUT 370 may encrypt a challenge message using the private key 352 installed in the boot image 350 and the system 300 (i.e., the processing resource 302) may decrypt that encrypted challenge message using a public key of the key pair 332. Such authentication may be deemed one-way authentication. Accordingly, the UUT 370 may trust subsequent communications received from the system 300.

The processing resource 302 may execute instructions 320 to verify that the UUT 370 booted to the unique boot image 350 bears the identification associated with unique boot image by instructions 312. For example, the processing resource 302 may verify that the device that booted to the unique boot image 350 is located at the same test bay location previously associated with the unique boot image 350 (e.g., via tracing the network port of the UUT 370 booted to the unique boot image 350) and/or can provide the same work order number previously associated with the unique boot image 350 (e.g., by prompting entry of a work order number at the device booted to the unique boot image 350).

Upon a successful verification of the identification, instructions 322 may cause the processing resource 302 to execute a test suite 330. The test suite 330 also may include test automation that executes diagnostic tools and the like on the UUT 370.

By virtue of booting the UUT 370 to a uniquely credentialed boot image and by key pair authentication, intellectual property such as firmware, drivers, diagnostic tools, automation, scripts, test data, etc., may be protected.

Figure 4:
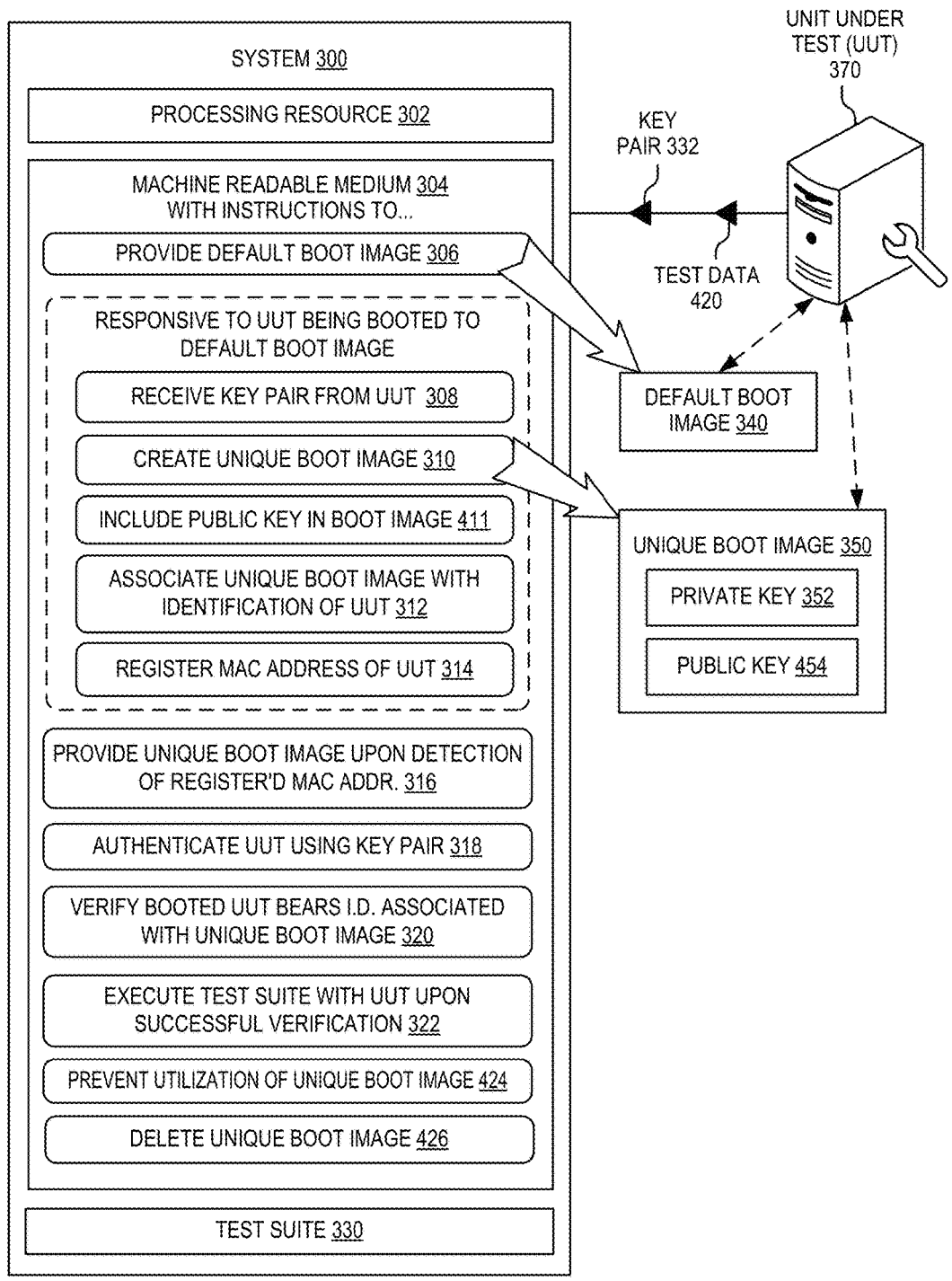
FIG. 4 is a block diagram depicting another example system that creates a boot image for a unit under test.

FIG. 4 is a block diagram depicting another example implementation of the system 300. The system 300 depicted in FIG. 4 may include many features of the system 300 depicted in FIG. 3, including a processing resource 302 and machine readable medium 304 with instructions 306, 308, 310, 312, 314, 316, 318, 320, 322 described above.

The medium 304 of FIG. 4 may also include instructions 411 that, when executed, cause the processing resource 302 include a public key 454 into the unique boot image 350. For example, the public key 454 may be part of a key pair, the private key of which (not shown) is owned and held by the system 300. By including a public key 454 in the boot image 350, the UUT 370 and the system 300 may engage in a two-way authentication (i.e., the instructions 318 may be a two-way authentication in this case). Two-way authentication may be useful for the system 300 to trust communications sent from the UUT 370, such as test data, in addition to the UUT 370 trusting communications from the system 300.

Instructions 424, when executed, may cause the processing resource 302 to prevent utilization of the unique boot image 350 by devices that do not present the registered MAC address (e.g., registered by instructions 314) or do not bear the identification associated with the unique boot image (e.g., identification associated by instructions 312). For example, instructions 424 may terminate ongoing communications to prevent utilization. Accordingly, by virtue of instructions 312, 314, 424, only the UUT 370 for which the unique boot image 350 was created is authorized to communicate with and be tested by the system 300. In some implementations, instructions 424 may further issue an alert if an unauthorized device has booted to the unique boot image but fails the verification under instructions 320. In further implementations, instructions 424 may log a location of the unauthorized device traced during the verification under instructions 320.

The system 300 may collect test data 420 resulting from executing the test suite 330. The medium 304 of FIG. 4 may also include instructions 426 that, when executed, cause the processing resource 302 to delete the unique boot image 350 upon completion of the test suite 330. Thus, privileged access to the UUT 370 ends when the boot image 350 is deleted.

Figure 5:
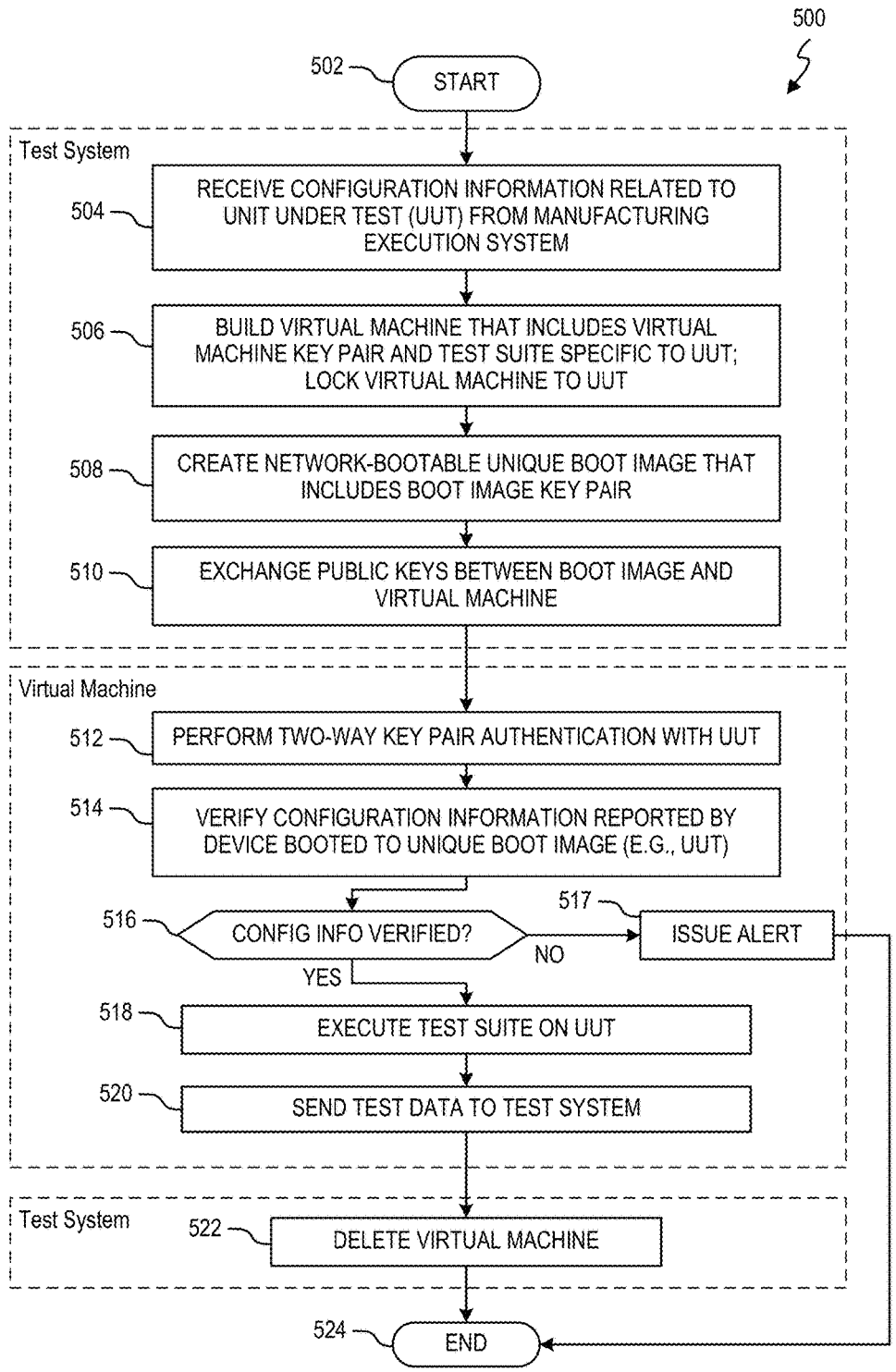
FIG. 5 is a flow diagram depicting an example method that builds a virtual machine that provides a unique boot image for a unit under test.
Figure 6:
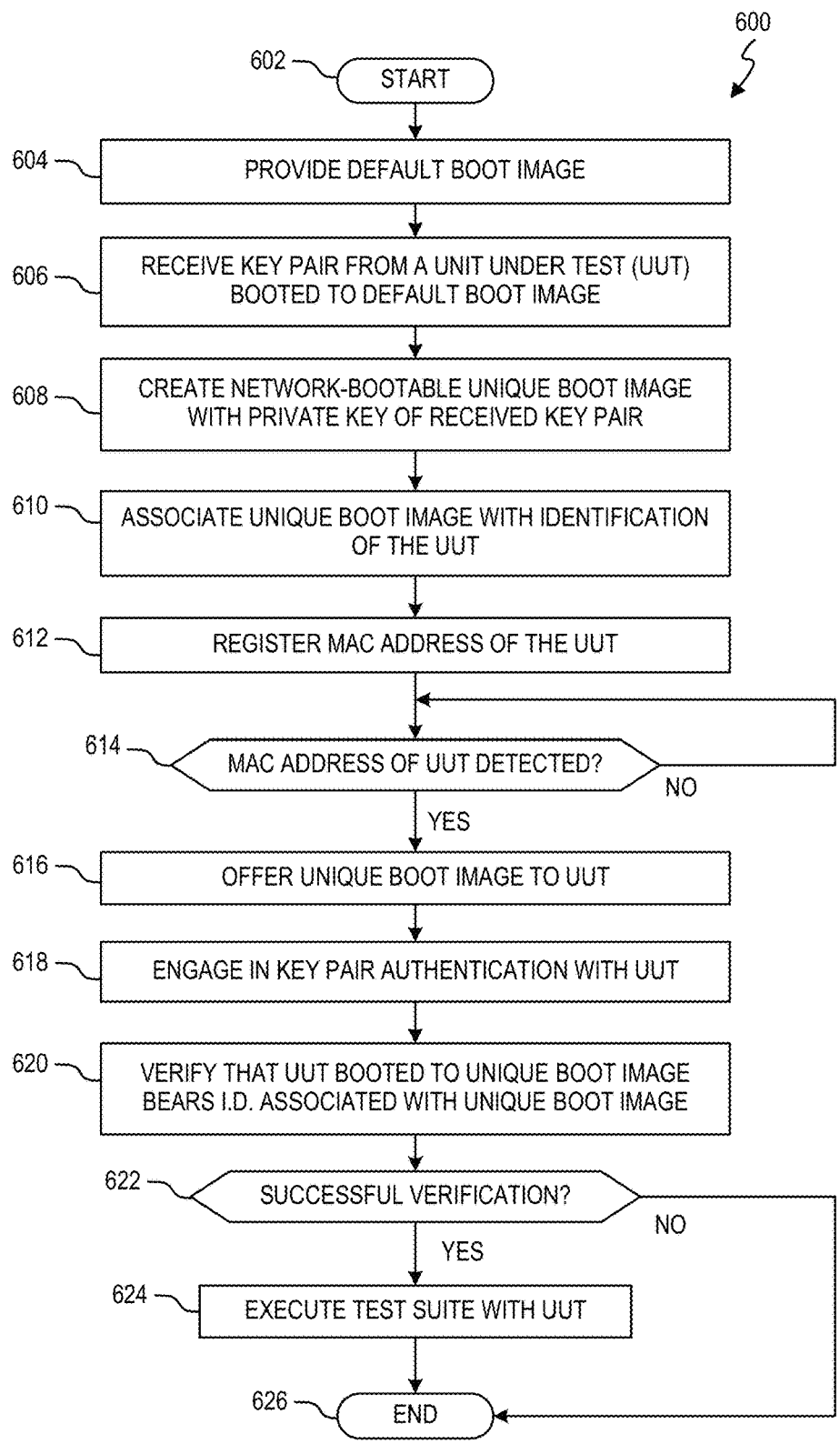
FIG. 6 is a flow diagram depicting an example method that creates a unique boot image for a unit under test.
Figure 7:
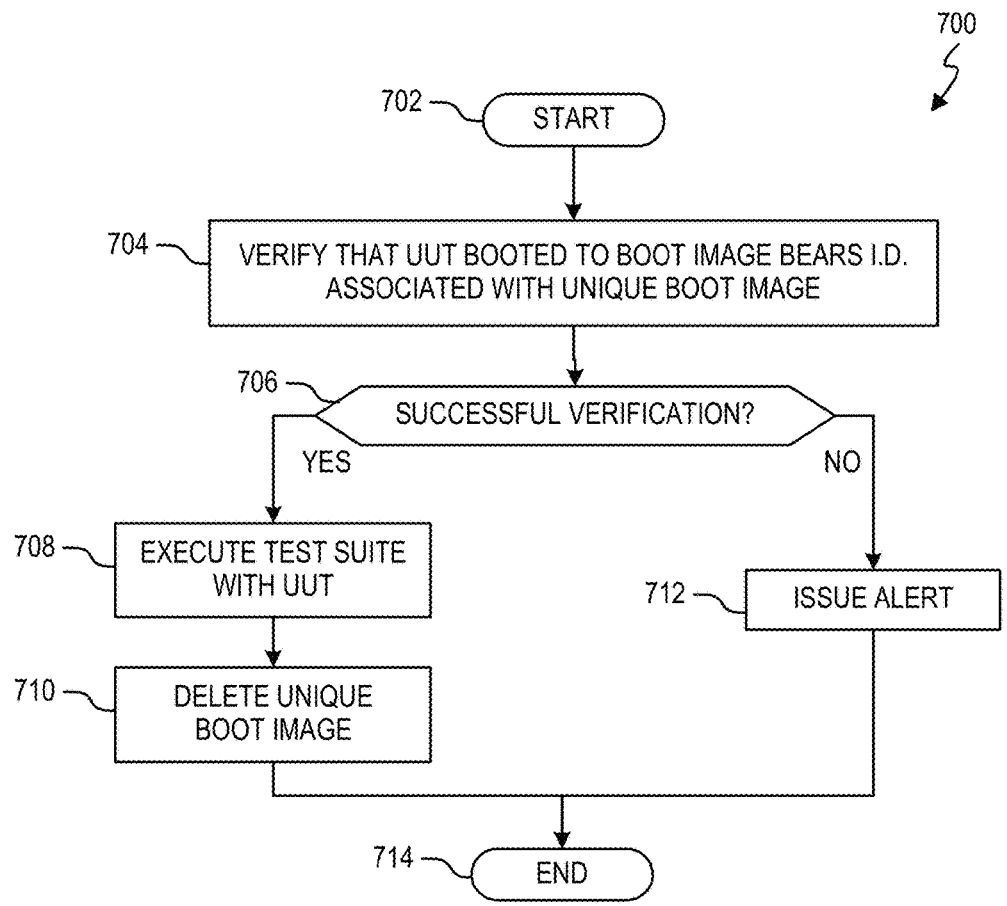
FIG. 7 is a flow diagram depicting an example method that verifies that a unit under test booted to a unique boot image bears identification associated with unique boot image.

FIGS. 5, 6, and 7, which depict example methods, will now be described in turn. In particular, FIG. 5 depicts an example method 500 that may be performed by a system 100. FIGS. 6 and 7 depict example methods 600 and 700, respectively, that may be performed by a system 300. In some implementations, one or more blocks of a method may be executed substantially concurrently or in a different order than shown in the figure. In some implementations, a method may include more or fewer blocks than depicted. In some implementations, one or more blocks of a method may, at certain times, be ongoing and/or may repeat.

FIG. 5 is a flow diagram depicting an example method 500 that builds a virtual machine that provides a unique boot image for a unit under test. Method 500 may be implemented in the form of executable instructions stored on a machine readable medium and executed by a processing resource and/or in the form of electronic circuitry. For example, at least parts of method 500 may be described below for illustrative purposes as being performed by a test system or systems with physical processing resources, such as the system 100 of FIG. 1 or 2. Portions of the method 500 may be described as being performed a virtual machine built by the test system, such as the virtual machine 120 of FIG. 1 or 2, a virtual machine being an emulation of a computing system on a hardware platform. Method 500 may be fully automated and may take place in a manufacturing environment using factory infrastructure.

The method 500 may start at block 502 and continue to block 504, where a test system (e.g., 100) receives configuration information (e.g., 152) related to a unit under test (e.g., 170) from a manufacturing execution system (e.g., 150). At block 506, the test system builds a virtual machine (e.g., 120) to contain a test suite specific to the UUT and to provide a unique boot image for network booting by the UUT (e.g., by setting up the virtual machine with PXE enabled DHCP and TFTP servers, etc.). Creation of the boot image will be described further with respect to block 508 below. The test system includes into the virtual machine a test suite (e.g., 126) specific to the UUT based on the configuration information received at block 504. For example, the test suite may include diagnostic software specific to the components, specifications, and configuration of the UUT, as indicated in the configuration information. At block 506, the test system also generates a virtual machine key pair (e.g., 122) and installs the key pair into the virtual machine. At block 506, the test system also locks the virtual machine to the UUT by, for example, registering a MAC address of the UUT (determined from the received configuration information) into a DHCP service of the virtual machine. In some implementations, only the MAC address of the UUT is allowed to be registered.

At block 508, the test system creates a network bootable unique boot image (e.g., 130). For example, the test system may include into the unique boot image drivers, firmware, etc. to support the components, specifications, configuration, etc. of the UUT as indicated in the received configuration information. In some implementations, the test system may include into the unique boot image automation or scripts related to testing the UUT.

During block 508, the test system generates a boot image key pair (e.g., 132) that is installed into the unique boot image. In some implementations, the test system uses information that identifies the UUT (e.g., UUID received with the configuration information at block 504) as a key generator passphrase to generate the boot image key pair. The test system then includes the boot image into the virtual machine.

At block 510, the test system exchanges public keys between the virtual machine and the boot image. More particularly, the test system copies the public key of the virtual machine key pair into the boot image and copies the public key of the boot image key pair into the virtual machine. Private keys of the key pairs generally are not exchanged.

The virtual machine is then started. For example, the virtual machine may be deployed or instantiated on the test system or on other another compute system within the factory infrastructure.

The UUT may initiate discovery of a network bootable server, and in response, the virtual machine may detect the UUT's discovery and perform a network boot handshake with the UUT. As the UUT boots to the unique boot image, at block 512, the virtual machine and the UUT perform a two-way key pair authentication. For example, encrypted challenge messages may be passed for authentication, as described above with respect to FIG. 1.

At block 514, the virtual machine verifies configuration information reported by the UUT booted to the unique boot image. For example, the unique boot image may cause the UUT to report a UUID or other configuration information back to the virtual machine, and the virtual machine may compare that reported configuration information, UUID or otherwise, against configuration information associated with the UUT at the manufacturing execution system. Block 514 may be useful for detecting or blocking devices that pretend to be the UUT and boot to the unique boot image by, for example, MAC address spoofing.

If the configuration information is not successfully verified against the manufacturing execution system ("NO" at block 516), the method may proceed to block 517, where the virtual machine may issue an alert indicating the presence of an unverified device on the factory infrastructure. The alert may be useful for triggering further investigation. After block 517, the method proceeds to end at block 524.

Referring back to block 516, if the configuration information is successfully verified against the manufacturing execution system ("YES" at block 516), the method proceeds to block 518, where the virtual machine executes the UUT-specific test suite on the UUT. The UUT may send test data (e.g., 220) from execution of the test suite, including test results, back to the virtual machine, and at block 520, the virtual machine may in turn send the test data to the test system.

At block 522, the test system may delete the virtual machine after execution of the test suite is complete. In some implementations, the test system may, as part of block 522, save manufacturing quality data, which may be used to rebuild or reconstruct the virtual machine and/or unique boot image, troubleshoot failures or defects of the UUT, or understand test results from testing the UUT. At block 524, the method 500 ends. In some implementations, testing of a UUT may employ multiple cycles of method 500.

FIG. 6 is a flow diagram depicting an example method 600 that creates a unique boot image for a unit under test. Method 600 may be implemented in the form of executable instructions stored on a machine readable medium and executed by a processing resource and/or in the form of electronic circuitry. For example, at least parts of method 600 may be described below for illustrative purposes as being performed by a test system with physical processing resources, such as the system 300 of FIG. 3 or 4. In some implementations, method 600 may be fully automated and may take place in a manufacturing environment using factory infrastructure. In particular, the test system and the unit under test described below may be located in a manufacturing environment.

The method 600 may begin at block 602, and proceed to block 604. At block 604, a test system (e.g., 300) provides a network-bootable default boot image (e.g., 340).

In response to a unit under test (e.g., 370) being booted to the default boot image, the test system may perform blocks 606, 608, 610, 612. At block 606, the test system receives a key pair from the UUT. For example, the key pair may be generated by the UUT using a UUID of the UUT as a passphrase for a key generator included in the default boot image. At block 608, the test system creates a network-bootable unique boot image (e.g., 350) having installed therein a private key (e.g., 352) of the received key pair. At block 610, the test system associates the unique boot image with an identification of the UUT. For example, the identification may include a work object number of the UUT or a test bay location of the UUT. At block 612, the test system registers a MAC address of the UUT, for example, with a DHCP service of the test system. The registered MAC address may also be linked to the unique boot image created at block 608 for PXE network booting.

In some implementations, a DHCP service of the test system may listen for DHCP discovery packets. Upon detection of the registered MAC address ("YES" at block 614), at block 616 the test system may offer the unique boot image to the UUT for network booting. Otherwise, the test system may continue to loop at block 614 to listen for DHCP discovery packets. As the UUT boots the offered unique boot image, the test system at block 618 engages in key pair authentication with the UUT, based on the received key pair installed in the unique boot image.

At block 620, the test system verifies that the UUT fully booted to the unique boot image bears the identification associated with the unique boot image. If the UUT booted to the unique boot image does not bear the identification ("NO" at block 622), the method proceeds to end at block 626. If the UUT booted to the unique boot image correctly bears the identification ("YES" at block 622), the test system executes a test suite with the UUT upon a successful verifying of identification. Test suite execution may include collection of test data from the UUT. The method ends at block 626.

In some cases, building and testing a UUT may occur over a duration of time (e.g., weeks, months). In a manufacturing environment that implements method 600, a test system or systems may create and delete multiple unique boot images to test the UUT over that duration of time.

FIG. 7 is a flow diagram depicting an example method 700 that verifies that a unit under test booted to a unique boot image bears identification associated with unique boot image. Method 700 may be implemented in the form of executable instructions stored on a machine readable medium and executed by a processing resource and/or in the form of electronic circuitry. For example, at least parts of method 700 may be described below for illustrative purposes as being performed by a test system with physical processing resources, such as the system 300 of FIG. 3 or 4. In some implementations, method 700 may be performed in conjunction with method 600, as will be described.

The method 700 may begin at block 702, and proceed to block 704, where a test system (e.g., 300) may verify that a unit under test (e.g., 370) booted to a unique boot image (e.g., 350) bears identification associated with unique boot image. For example, block 704 may be analogous to block 620. In some implementations, blocks 704-714 may be substituted into method 600 for blocks 620-626.

If the verifying at block 704 is successful ("YES" at block 706), the test system may execute a test suite (e.g. 330) with the UUT at block 708 and then delete the unique boot image at block 710 upon completion of executing the test suite.

If the verifying at block 704 is not successful ("NO" at block 706), the test system may, at block 712, issue an alert that a device booted to the unique boot image does not bear the identification associated with the unique boot image. In such a case, the device booted to the unique boot image may have appeared to be the UUT by virtue of MAC spoofing, but may actually be an unauthorized and possibly malicious device. The alert may also capture location information about the unauthorized device. After blocks 708 and 712, the method may end at block 714.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising:
a processing resource; and
a non-transitory machine readable medium storing instructions that, when executed, cause the processing resource to:
provide a network-bootable default boot image,
responsive to a unit under test (UUT) being booted to the default boot image:
receive a key pair from the UUT,
create a network-bootable unique boot image that includes a private key of the key pair,
associate the unique boot image with an identification of the UUT, and
register a media access control (MAC) address of the UUT,
provide the unique boot image to the UUT upon detection of the registered MAC address,
authenticate with the UUT using the key pair,
verify that the UUT booted to the unique boot image bears the identification associated with unique boot image, and
execute a test suite with the UUT upon a successful verification.

2. The system of claim 1, the machine readable medium storing instructions that, when executed, cause the processing resource to delete the unique boot image upon completion of the test suite.

3. The system of claim 1, wherein the identification of the UUT includes a work object number of the UUT or a test bay location of the UUT.

4. The system of claim 1, the machine readable medium storing instructions that, when executed, cause the processing resource to include a public key into the unique boot image, and
the authentication is a two-way authentication.

5. The system of claim 1, the machine readable medium storing instructions that, when executed, cause the processing resource to prevent utilization of the unique boot image by devices that do not present the registered MAC address or do not bear the identification associated with the unique boot image.

6. A method performed by a test system comprising:
providing a network-bootable default boot image;
responsive to a unit under test (UUT) being booted to the default boot image:
receiving a key pair from the UUT,
creating a network-bootable unique boot image having installed therein a private key of the received key pair,
associating the unique boot image with an identification of the UUT, and
registering a media access control (MAC) address of the UUT;
offering the unique boot image to the UUT upon detection of the registered MAC address;
engaging in key pair authentication with the UUT, based on the received key pair;
verifying that the UUT booted to the unique boot image bears the identification associated with the unique boot image; and
executing a test suite with the UUT upon a successful verifying of identification.

7. The method of claim 6, further comprising deleting, by the test system, the unique boot image upon completion of executing the test suite.

8. The method of claim 6, wherein the identification includes a work object number of the UUT or a test bay location of the UUT.

9. The method of claim 6, wherein the test system and the UUT are at a manufacturing environment.

10. The method of claim 6, further comprising issuing, by the test system, an alert that a device booted to the unique boot image does not bear the identification associated with the unique boot image.

* * * * *